United States Patent

[11] 3,545,750

| | | |
|---|---|---|
| [72] | Inventor | John Joseph Stachnik, Sr<br>R.D. 1, Hallstead, Pennsylvania 18822 |
| [21] | Appl. No. | 744,463 |
| [22] | Filed | July 12, 1968 |
| [45] | Patented | Dec. 8, 1970 |

[54] SIMULATED FISHING GAMES
5 Claims, 4 Drawing Figs.

[52] U.S. Cl. ............................................... 273/1, 273/140
[51] Int. Cl. .................................................... A63f 9/00
[50] Field of Search........................................ 273/1, 140

[56] References Cited
UNITED STATES PATENTS

| 483,772 | 10/1892 | Sloan............................ | 273/140X |
| 626,995 | 6/1899 | Haigh........................... | 273/140 |
| 1,473,603 | 11/1923 | Anderson..................... | 273/140 |
| 1,594,164 | 7/1926 | Foster........................... | 273/140X |

FOREIGN PATENTS

| 281,177 | 1927 | Great Britain................ | 273/140 |

Primary Examiner—Anton O. Oechsle
Assistant Examiner—Paul E. Shapiro
Attorney—Jerry B. Cesak ABSTRACT: A housing containing a rotatable receptacle with simulated fish therein, the housing having a top provided with openings through which access to the receptacle may be had. Agitating members depend from the top of the housing into the receptacle so as to shift the position of the fish as the receptacle rotates. Fishing poles are movably positioned on top of the housing and have lines insertable through the top openings into the receptacle for engaging and catching the fish.

PATENTED DEC 8 1970
3,545,750
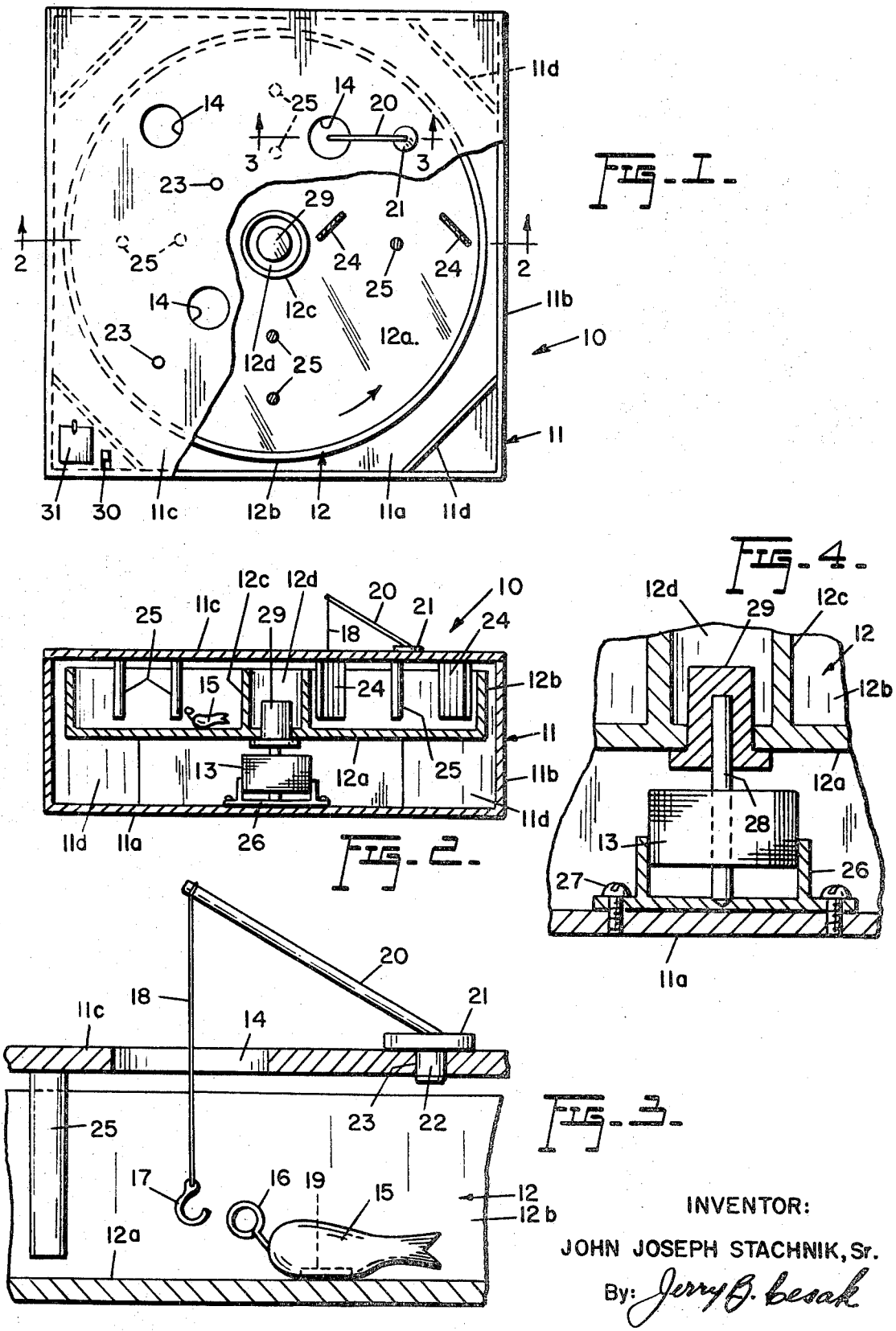
INVENTOR:
JOHN JOSEPH STACHNIK, Sr.
By: Jerry B. Besak

SIMULATED FISHING GAMES

This invention relates to new and useful improvements in game apparatus, and in particular the invention concerns itself with a simulated fishing game in which one or more players may participate in efforts to catch a simulated fish.

The principal object of the invention is to provide a compact, simple, but highly amusing and entertaining simulated fishing game which combines the elements of chance and skill in order for a simulated fish to be caught by any of the players. The game may be played by persons of various ages and lends itself to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a top plan view of a simulated fishing game in accordance with the invention, the top thereof being partially broken away to reveal the interior;

FIG. 2 is vertical sectional view, taken substantially in the plane of the line 2–2 in FIG. 1;

FIG. 3 is an enlarged, fragmentary vertical sectional detail, taken substantially in the plane of the line 3–3 in FIG. 1; and FIG. 4 is an enlarged, fragmentary vertical sectional detail showing the mounting of the motor and receptacle.

Referring now to the accompanying drawings in detail, the invention comprises a simulated fishing game designated generally by the reference numeral 10. The same consists of a housing 11 which, although shown as being rectangular, may have any other suitable configuration. The housing includes a bottom 11a, perimetric walls 11b and a top 11c suitable corner brass 11d being provided, if desired.

The upper portion of the housing 11 contains a circular receptacle 1 which is open at its top and consists of a circular bottom 12a with a peripheral wall 12b. Conveniently, although not necessarily, the receptacle may also have an inner, concentric annular wall 12c defining a cylindrical chamber 12d at the center of the receptacle, separate from the surrounding receptacle portion between the walls 12b and 12c. In any event, the receptacle 12 is rotatably mounted in the housing 11, being rotated and supported by a slow-speed electric motor 13, as will be hereinafter described.

The top 11c of the housing 11 is formed with a plurality of relatively large openings 14 through which access to the receptacle 12 may be had. The receptacle itself contains a plurality of movably disposed, simulated fish 15, each equipped with an eye 16 for catching the same by a hook 17 on a fishing line 18.

The fish 17 preferably have a flat lower portion which may be provided with an embedded weight 19, so as to enable the fish to rest in an upright position on the bottom 12a of the receptacle.

The fishing line 18 is connected to an inclined fishing pole 20 which is secured to a base 21, the latter being equipped with a depending pin 22 which may be inserted into any one of a number of apertures 23 which are formed in the top 11c of the housing 11 adjacent the aforementioned openings 14. Several of the fishing poles and lines may be employed, as for example one for each player, and the arrangement is such that when the base pin 22 of any one of the fishing poles is inserted into the aperture 23, the fishing line 23 may extend through the adjacent opening 14 into the receptacle 12 for possible engagement of the hook 17 with the eye 16 of one of the fish 15. It may be also noted that the base pin 22 of the fishing pole is not only inserted into the aperture 23 so as to facilitate fishing through any one of the openings 14, but the pin may also be turned axially in the aperture in order to move the fishing pole laterally to some extent, thus locating the fishing line 18 either centrally or eccentrically in the opening 14 and affording a certain amount of choice as to positioning of the hook 17 with respect to the receptacle 12.

A plurality of agitating members 24, 25 are secured to and depend from the underside of the top lie of the housing into the receptacle 12. These agitating members may be flat plates as in the instance of the members 25. In either event, when the receptacle 12 is rotated by the motor 13, the fish 15 in the receptacle come in contact with the relatively stationary agitating members and are shifted thereby so that the position of the fish in the receptacle is continually changing.

As shown in FIG. 4, the slow-speed electric motor 13 is supported by a bracket 26 secured to the bottom 11a of the housing 11 by suitable screws 27, the motor armature 28 projecting upwardly into a bushing 29 which extends through the receptacle bottom 12a into the central chamber 12d of the receptacle. The receptacle and the bushing 29 are, of course, rotatable with the motor armature 28 and are supported thereby in the housing 11.

One corner portion of the housing 11 spanned by the brace 11d may serve as a compartment for an electric battery (not shown) supplying current to the motor 13 through a suitable switch 30 on top of the housing, the housing top also being provided with an access door 31 for the battery compartment, as indicated in FIG. 1.

The entire device may be of any suitable material such as plastic, metal, wood, et cetera, and may be used in "dry" fishing, that is, with the fish 15 being simply positioned on the bottom 12a of the receptacle 12, to be caught by the fishing lines as the rotation of the receptacle takes place and the fish are shifted to different positions in the receptacle by the agitating members 24, 25. However, if so preferred, the receptacle 12 may contain a liquid such as water and the fish 15 may have sufficient buoyancy to float in the water, so as to produce an even more realistic fishing effect.

Thus, while in the foregoing there has been described and shown the preferred embodiment of the invention, various modifications may become apparent to those skilled in the art to which the invention relates. Accordingly, it is not desired to limit the invention to this disclosure, and various modifications and equivalents may be restored to, falling within the spirit and scope of the invention as claimed.

I claim:

1. A simulated fishing game, comprising in combination, a housing having a top provided with at least one access opening, a receptacle rotatably mounted in said housing, means for rotating said receptacle, a fishing pole disposed exteriorly of the housing and having a line insertable through the access opening in the top of the housing into said receptacle for engaging and catching said simulated fish, and at least one agitating member secured to and depending from the top of said housing into said receptacle, said agitating member being engageable by said fish whereby to shift the position of the fish in the receptacle while the latter is rotating.

2. The device as defined in claim 1 together with coacting hook and eye means provided on the line of said fishing pole and on said fish for engagement of the latter by the former.

3. The device as defined in claim 1 together with means removably mounting said fishing pole on the top of said housing.

4. The device as defined in claim 3 wherein the top of said housing is provided with an aperture adjacent said opening, said fishing pole mounting means comprising a pin-equipped base carrying the fishing pole, the pin of said base being removably receivable in said aperture.

5. The device as defined in claim 1 wherein said means for rotating said receptacle include an electric motor mounted in said housing and operatively connected to the receptacle for rotating the same.